United States Patent [19]

Kochera

[11] 4,361,057
[45] Nov. 30, 1982

[54] HANDLEBAR ADJUSTING DEVICE

[75] Inventor: Peter G. Kochera, Parma, Ohio

[73] Assignee: John Sigan, Strongsville, Ohio ; a part interest

[21] Appl. No.: 125,679

[22] Filed: Feb. 28, 1980

[51] Int. Cl.³ .............................................. B62K 21/16
[52] U.S. Cl. .................................... 74/551.4; 403/93; 403/98; 411/115; 411/140; 411/143
[58] Field of Search ................ 74/551.3, 551.4, 551.6, 74/551.7, 551.8; 403/95, 96, 97, 92, 93, 103; 280/278, 287; 411/114, 115, 140, 143

[56] References Cited

U.S. PATENT DOCUMENTS

| 426,485 | 4/1890 | Whiteley | 411/143 X |
|---|---|---|---|
| 491,908 | 2/1893 | Starz | 411/143 |
| 575,746 | 1/1897 | Wheeler | 74/551.4 |
| 583,105 | 5/1897 | Wheeler | 74/551.4 |
| 598,202 | 2/1898 | Harrell | 74/551.4 |
| 602,625 | 4/1898 | La Fave | 74/551.4 |
| 603,995 | 5/1898 | Powell | 74/551.4 |
| 689,217 | 12/1901 | Palmer | 74/551.3 |
| 1,059,863 | 4/1913 | Hughes | 411/114 |
| 1,122,995 | 12/1914 | Parris | 411/114 |
| 1,595,557 | 8/1926 | Mamiya | 74/551.4 |
| 1,717,668 | 6/1929 | Phaenens | 411/140 |
| 3,481,218 | 12/1969 | Yoshikawa | 74/551.3 |
| 3,803,937 | 4/1974 | Johnston | 74/551.6 X |
| 3,863,521 | 2/1975 | Gatsos et al. | 74/551.4 |
| 4,023,436 | 5/1977 | Dodge | 74/551.3 |

FOREIGN PATENT DOCUMENTS

| 96826 | 4/1898 | Fed. Rep. of Germany | 74/551.4 |
|---|---|---|---|
| 982528 | 6/1951 | France | 74/551.4 |
| 115367 | 5/1918 | United Kingdom | 74/551.4 |

Primary Examiner—Allan D. Herrmann
Attorney, Agent, or Firm—Squire, Sanders & Dempsey

[57] ABSTRACT

A device for changing drop-style handlebars between a downward or racing position and a touring or general use position, comprising a coupler including two mutually rotatable members, attached respectively to a free or gripping part of a handlebar and to a central part of the handlebar which is secured to a steering post.

16 Claims, 8 Drawing Figures

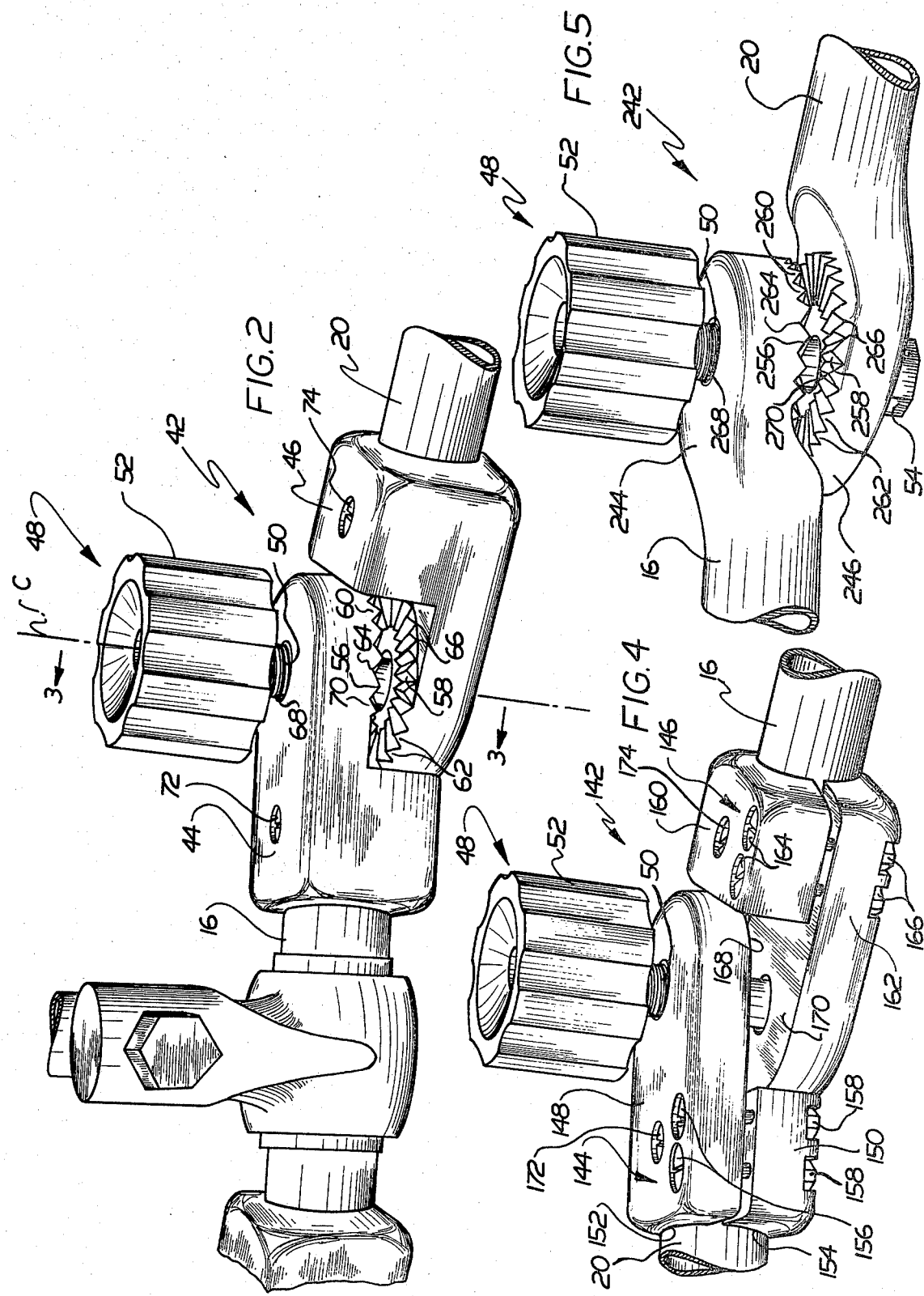

HANDLEBAR ADJUSTING DEVICE

The present invention relates to bicycles and the like and to the adjustment of handlebars between a position suitable for sport or racing uses and a position suitable for touring or general bicycling uses.

BACKGROUND OF THE INVENTION

Popular, lightweight bicycles, especially those fitted with ten-speed transmissions and intended for racing or sport uses, are equipped with drop or racing handlebars that emerge from a steering post transverse to the front wheel of the bicycle, eventually bending so as to be generally parallel to the front wheel with the grips extending rearward. The handlebar has free end portions on opposite sides of the post on which grips are located below the point of attachment of the handlebars to the steering post of the bicycle, with the free end portions disposed in vertical planes generally parallel to the front wheel of the bicycle. This configuration permits the rider to bend over in a crouching position while riding and to apply his maximum force and effort to the pedals thereby maximizing his speed.

With the handlebar grips located below the point of attachment to the steering post, however, a bicycle is not suited for general touring or traveling uses since the rider is bent over and cannot comfortably observe his surroundings or carry on conversation with fellow cyclers. Bicycles produced for touring uses generally have the grips of the handlebars located in horizontal planes transverse to the front wheel of the bicycle and located at least as high as the point of attachment of the handlebars to the steering post of the bicycle.

Although a rider might acquire both a racing and a touring bicycle so as to be equipped for either use, it is not economical to do so and numerous inventors have disclosed means for adjusting the handlebars of a single bicycle between the racing and touring positions.

The simplest constructions provide for the rotation of the handlebars on an axis transverse to the plane of the front wheel of the bicycle. This rotation is generally easy since most handlebars are attached to the bicycle steering post with a compression clamp that need only be loosened to permit the rotation. See U.S. Pat. No. 689,217. Modern racing and touring bicycles generally have brakes activated by cable-connected levers attached to the free end portions of the handlebars. Rotating the handlebars about the axis of the steering post clamp reverses the action of the brake levers thereby creating a potential for inadvertently applying the brakes unless the levers are modified. See U.S. Pat. No. 3,803,937. Other inventions for changing the position of the gripping parts of the handlebar to make bicycles collapsible for shipping have involved rotation plus disassembly of the handlebar, all of which is inconvenient, time-consuming and requires the use of tools. See U.S. Pat. No. 3,481,218.

Yet other inventors have disclosed means of adjusting the position of bicycle handlebar grips by providing for rotation of the bars about axes generally parallel to the front wheel of the bicycle and very close to the frame of the bicycle. See U.S. Pat. Nos. 575,746, 583,105 and 603,995. While these inventions may overcome the problem with the reversal of the action of the hand brake levers, all suffer from the disadvantage that the distances of the handlebars from each other and from the bicycle frame vary widely according to the horizontal position of the handlebar grips. Thus, in the drop or racing position, the handlebars can be undesirably far apart if a comfortable spacing in the touring position is provided.

More modern disclosures of adjustable handlebar inventions involve complicated multiple joints and/or complex machined parts resulting in high cost, expensive modification of an existing bicycle and/or relatively long times in making adjustments of the handlebar positions. U.S. Pat. No. 1,595,557 discloses a construction which permits rapid adjustment of the handlebar position by the use of spring-release pawl mechanisms. But those mechanisms require relatively expensive machined parts and do not permit simple modification of the existing handlebars for use as part of the invention. The apparatus disclosed in U.S. Pat. No. 4,023,436 to Dodge, provides for great variations in the location of the handlebar grips, but only with expensive modification of the existing handlebars, including the replacement of the existing handlebar steering post with an entirely different support means. Furthermore, except possibly for an adjustment of the angle of the gripping parts of the handlbar with respect to a vertical supporting member, adjustment of the Dodge handlebar is time-consuming and requires the use of tools.

Therefore, it is a primary object of the present invention to provide an inexpensive and rapid means by which the handlebars of a bicycle or the like may be adjusted between racing or drop positions and touring positions.

SUMMARY OF THE INVENTION

The objects of this invention are accomplished in the preferred embodiment of the invention by providing a coupler having cooperating, releasably locking members inserted in a juncture in the handlebar at a chosen location displaced towards the free end or gripping portion of the handlebar from the place of attachment of the handlebar to the steering post of the bicycle. The coupler members may be made of a suitable material, such as metal or thermoplastic, and attached to an existing handlebar or may be an integral part of a handlebar as originally fabricated. The members of the coupler when in the released condition permit the rotation of the handlebar gripping portion on an axis transverse to the axis of the central handlebar portion. A desired position of the handlebar gripping portion is selectably fixed by clamping the members of the coupler tightly together in the locking condition. The original drop or racing position, the touring position, a collapsed position or any of numerous intermediate or extended positions of the handlebars may be maintained with the coupler members clamped in the locking condition.

BRIEF DESCRIPTION OF DRAWINGS

FIG. 2 is a detailed plan view of a coupler according to a preferred embodiment of the invention installed on a bicycle handlebar.

FIG. 4 is a detailed plan view of another embodiment of the coupler according to the invention installed on a bicycle handlebar as seen from below the handlebar.

FIG. 5 is a detailed plan view of a coupler formed as an integral part of a handlebar according to another embodiment of the invention.

DESCRIPTION OF PREFERRED EMBODIMENT

Figure 1:
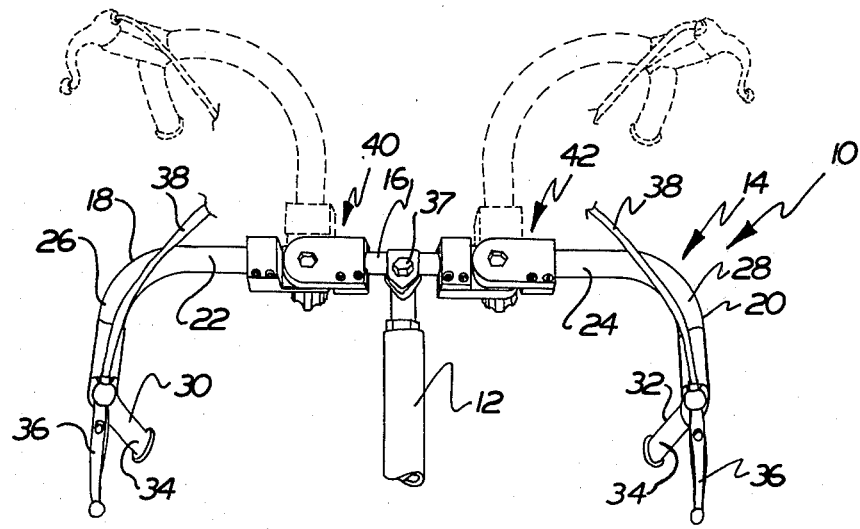
FIG. 1 is a partial front view of a bicycle incorporating apparatus according to a preferred embodiment of the invention.

Referring now to the drawings, there is shown in FIG. 1 a bicycle 10 of the ten-speed type, having a steering column or post 12 and handlebars 14. Handlebars 14 would conventionally be a unitary member, but for the reasons explained below, they comprise three portions: a central portion 16, and opposite end portions 18 and 20. When handlebars 14 are attached to the steering post, end portions 18,20 include straight sections 22,24 transverse to the plane of the front wheel of the bicycle (not shown), curved or bent portions 26,28, and free end or gripping portions 30,32 on which hand grips 34 are mounted. Curved portions 26,28 and gripping portions 30,32 lie in planes generally parallel to the bicycle's front wheel. Manual brake levers 36 for moving brake cables 38 are attached to end portions 18,20 in a conventional manner. Central portion 16 is clamped on post 12 by a conventional clamp 37.

Handlebar end portions 18,20 are movably attached to central portion 16 by means of couplers 40,42 which are preferably identical. Couplers 40,42 enable end portions 18,20 to be moved between the standard racing position shown in solid lines, and any of numerous other positions including the raised or touring positions shown in dotted lines in FIG. 1.

Figure 3:
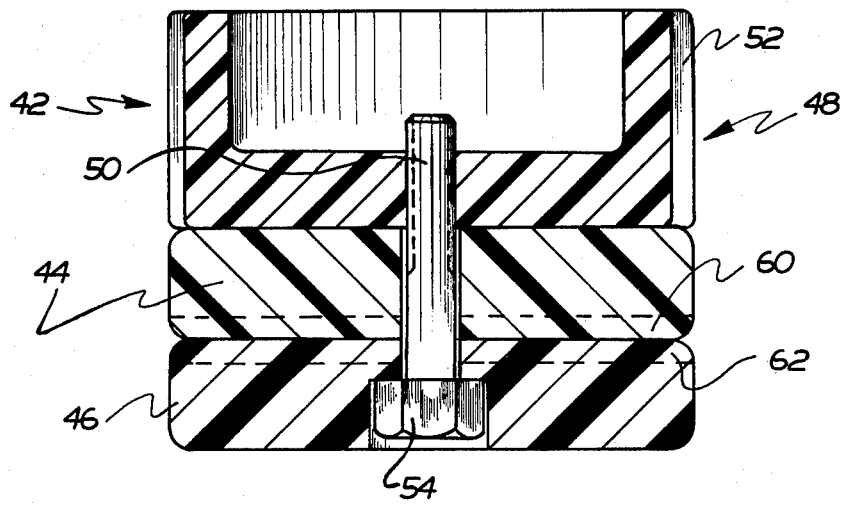
FIG. 3 is a section taken in the direction 3—3 of FIG. 2.

Turning to FIGS. 2 and 3, coupler 42 comprises a first coupler member 44 attached to central handlebar portion 16, a second coupler member 46 attached to end handlebar portion 20, and a clamping or retaining means in the form of a screw assembly 48 including a connecting means such as a threaded bolt or screw 50 having a head 54 (shown in FIG. 3), screw 50 engaging a knob or nut 52. Knob 52 is shown in FIG. 2 as having a concave top whereas in FIG. 3 the knob is shown in an alternative hollow, lightweight configuration requiring less meterial. Coupler members 44,46 are provided with connecting means which are shown as locking means in the form of mutually engageable mating faces 56,58, these faces having identically equally spaced teeth or projections 60,62 and alternating grooves 64,66 extending radially from aligned axes C—C. Members 44,46 have coaxial bores 68,70 for receiving bolt 50. The clockwise rotation of screw assembly 48 clamps members 44,46 together by urging the teeth of the respective coupler members into the corresponding grooves of the other coupler member. Coupler members 44 and 46 must be securely attached to the handlebar portions 16 and 20, respectively, to avoid rotation of the coupler members about the handlebar portions. Particularly in the case of thermoplastics, this can be done by molding the coupler members to the adjacent end portions of handlebar sections 16 and 20 and 16 and 18 and inserting pin means engaging the coupler members and handlebar portions, such as self-tapping screws 72,74 in members 44 and 46 and handlebar portions 16 and 20, respectively. Screws 72,74 engage previously drilled holes (not shown) in handlebar portions 16 and 20. Alternatively, adhesives or other mechanical securing means could be used. The coupler members could be fabricated from metal, in which case brazing or welding techniques could be used to affix the members to the handlebar sections.

FIG. 4 shows a coupler 142 according to another embodiment of the invention. Coupler 142 is composed of a first coupler member 144 and a second coupler member 146, attached respectively to handlebar sections 16 and 20. Coupler members 144 and 146 differ from previously described members 44 and 46 in that they are assemblies of elements designed to mechanically lock the coupler members on the handlebar sections. Thus, coupler member 144 is comprised of sections 148,150 which have cooperating generally semi-cylindrical surfaces 152,154 configured to wrap around and engage central handlebar section 16. A pair of threaded bolts 56 extend through aligned bores in sections 148,150, and nuts 158 engage the threaded ends of the bolts. When nuts 158 are tightened on bolts 156, sections 148,150 are drawn tightly together to lock coupler member 144 on handlebar section 16. Coupler member 146 is similarly constructed with sections 160,162, which are locked onto handlebar section 20 upon the tightening of nuts 166 on bolts 164. To prevent rotation of members 144 and 146 on handlebar portions 20 and 16, respectively, the members and handlebar portions are pinned together by self-tapping screws 172 and 174 inserted in members 144 and 146 to engage previously drilled holes (not shown) in handlebar portions 16 and 20. Coupler members 144,146 are clamped and released under the action of screw assembly 48 as in the previously described embodiment. The mating faces 168,170 of coupler members 144,146 are shown as being flat; however, they could be roughened, configured, or provided with intermediate elements to provide the desired locking effect when the members 144,146 are clamped together for the purpose of releasably locking the handlebar sections in some desired relationship.

FIG. 5 shows a coupler 242 according to still another embodiment of the invention. Coupler 242 comprises a first coupler member 244 fabricated as an integral part of central handlebar portion 16. Second coupler member 246 comprises a second coupler member 246 fabricated as an integral part of handlebar end portion 20. The clamping means is composed of screw assembly 48 including a threaded bolt 50 having a head 54, bolt 50 engaging knob or nut 52 as described with the embodiment of the invention depicted in FIGS. 2 and 3. Members 244,246 are provided with connecting means in the form of locking means in the mutually engageable mating faces 256,258, these faces having the identically equally spaced projections 260,262 and alternating grooves 264,266 extending radially from the axis of bolt 50 which passes through co-axial bores 268,270 in members 244,246, respectively. Members 244,246 are clamped together by screw assembly 48 by urging the teeth of the respective coupler members into the corresponding grooves of the other coupler member.

Figure 6:
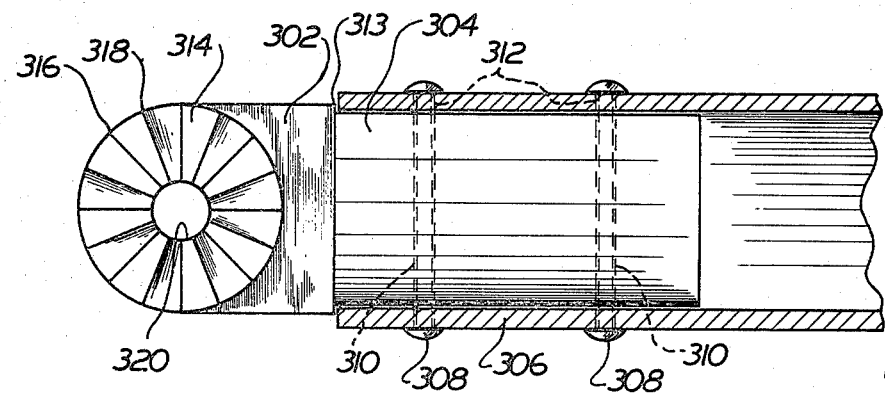
FIG. 6 is a side view of an embodiment of one member of a coupler installed in a handlebar portion which is shown in partial section.

FIG. 6 shows one member 302 of a pair of like, cooperating members attached to adjacent handlebar portions to form a coupler. Member 302 has an attachment portion 304 adapted in cross section to slide snugly within a hollow handlebar portion 306 which is shown in partial section. Member 302 is restrained from rotating within handlebar portion 306 by two fasteners 308, such as rivets, passing through holes 310 in attachment portion 304 and coaxially aligned holes 312 in handlebar portion 20. Member 302 has a shoulder 313 limiting the depth of insertion in handlebar portion 306 and a face 314 seen in plan view in FIG. 6, configured with alternating radial projections 316 and grooves 318 for use with a similarly configured member (not shown) as connecting or locking means. The members are clamped together by a connecting or clamping means such as that shown in FIG. 3, and member 302 has a hole 320 for receiving bolt 50 (shown in FIG. 3) as part of the clamping means.

Figure 7:
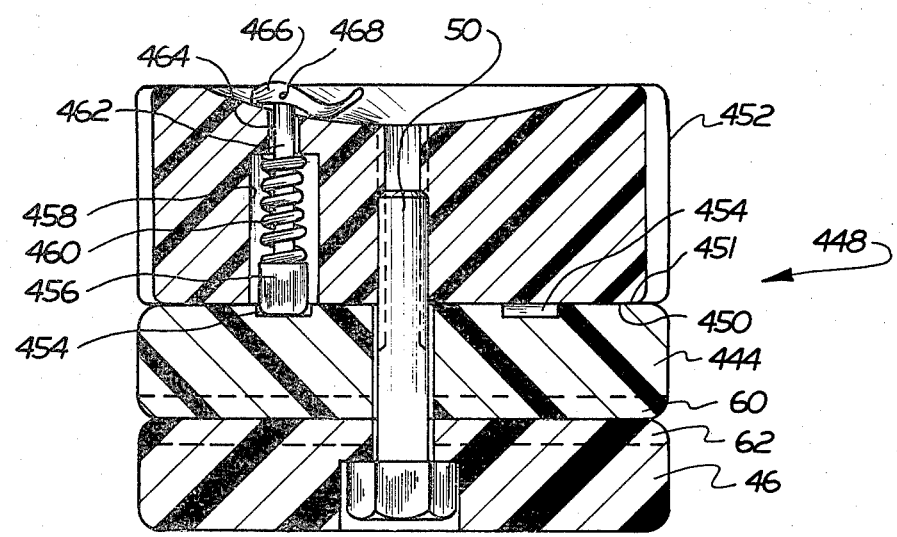
FIG. 7 is a sectional view of another embodiment of the clamping means shown in FIG. 3 to which a stop means has been added.

FIG. 7 shows in a sectional view a different embodiment of the clamping means shown in FIG. 3. A clamping assembly 448 is depicted in FIG. 7 which contains components corresponding to those of the embodiment shown in FIG. 3. In addition, a surface 450 of a coupler member 444 which is opposed to a surface 451 of a knob 452 contains a plurality of sockets 454 disposed radially about bolt 50 adapted to receive a blocking member 456. Blocking member 456 is retained within a cylinder 458 bored within knob 452 generally parallel to and offset from bolt 50. Blocking member 456 is urged into one of sockets 454 by a coil spring 460 located within cylinder 458 and pressing at its opposite ends on the cylinder 458 and blocking member 456, respectively. Spring 460 surrounds a shaft 462, one end of which is attached to the blocking member, the other end of shaft 462 passing through knob 452 opposite surface 451 via a hole 464 smaller in diameter, coaxial and in communication with cylinder 458. A lever 466 is attached by a pivot 468 near the end of shaft 462 which projects from hole 464 so that blocking member 456 may be withdrawn from socekt 454 by applying pressure to one end of lever 466 thereby retracting member 456 and shaft 462 and compressing spring 460. Withdrawal of the blocking member from socket 454 permits rotation of knob 452, rotation otherwise being prevented by the blocking member.

Figure 8:
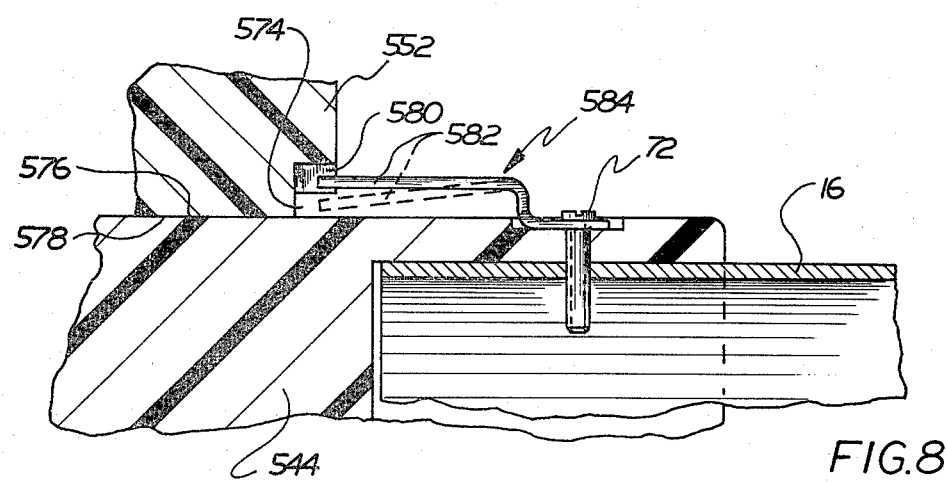
FIG. 8 is a partial sectional view of a coupler member, handlebar portion and clamping means with another embodiment of a stop means added.

FIG. 8 presents a detail view of still another variation of the embodiment of FIG. 2, showing in partial cross section a knob 552, a coupler member 544, handlebar portion 16 and self-tapping screw 72 passing through member 544 and engaging handlebar portion 16. In FIG. 8, an annulus 574 is provided along the lower periphery of knob 552. A surface 576 defines the underside of knob 552 opposed to a surface 578 of member 44. Adjacent to annulus 574 on the periphery of knob 52 is cut a plurality of notches 580 adapted to receive an end 582 of a stop 584. Stop 584 is comprised of a resilient material such as spring steel with a free end 582 susceptible of deflection under pressure and an opposite end attached to coupler member 544 by self-tapping screw 72. When end 582 is depressed as shown in dashed lines of FIG. 8, knob 552 may be rotated, but rotation is otherwise prevented by end 582 of stop 584.

In use, the first coupler members of a pair of couplers (e.g., members 44,144 or 244 for couplers 42,142 and 242, respectively) attached to the central portion of the handlebar 16, remain fixed while the second coupler members (e.g., 46,146 or 246 for couplers 42,142 and 242, respectively) are capable or rotating along with the handlebar gripping portions (i.e., 18,20) on the axis of each screw 50 passing through each respective pair of coupler members. Screw assembly 48 is employed to adjustably fix the location of the rotating or second coupler member with respect to the fixed or first member so that the handlebar grips 34 remain fixed in a preselected desired position.

Couplers according to the embodiments shown in FIGS. 1, 2, 4 and 6 can be used as accessories to bicycles having conventional handlebars or the embodiment shown in FIG. 5 can be original equipment for new handlebars. A coupler 42 or 142 shown in FIGS. 2 and 4 used as an accessory is installed by severing handlebar 14 at a point displaced from the steering post 12, such as with a hacksaw, pipe cutter or other appropriate instrument, leaving central handlebar portion 16 attached to clamp 37. A pilot hole is drilled in the handlebar portions 16 and 20 to receive the self-tapping screws, e.g. 72, 74, 172 and 174. One member, e.g., 44, 144, of a coupler, e.g., 42, 142, is attached to the central handlebar portion 16 and the other member, e.g., 46, 146, is attached to the free end portion 20 of the handlebar and the respective self-tapping screws are tightened. When the attaching means of FIG. 4 is incorporated in the device, the coupler members are attached to the adjacent ends of the handlebar members with a simple screwdriver. Assembly of a retaining or clamping means such as one of those shown in FIGS. 3, 7 and 8 with the coupler members completes the installation. Since the coupler members in these two embodiments fully surround the ends of the handlebar sections to which they are attached, the rough sawn edges are inaccessible and there is no danger of injury to persons using the bicycle or adjusting the handlebars. A coupler, one member 302 of which is shown in FIG. 6, is installed in an analogous manner, the handlebars being severed and holes 312 being drilled in the handlebar portions to align with holes 310 in each coupler member and to receive pins 308. The coupler member attachment portions adapted to the handlebar cross section are merely inserted into the hollow handlebars, the pins attached and a clamping means such as one of those shown in FIGS. 3, 7 and 8 is assembled with the coupler members to complete the installation. In this embodiment the sawn edges are exposed and should be smoothed as a safety precaution. With any of the accessory embodiments shown, it may be desirable to remove a length of handlebar from either the central portion 16 or end portion 20 so as to compensate for the length added to the handlebar by the insertion of a coupler. When the couplers are to be incorporated as original, integral parts of the handlebars, the handlebars can be constructed in pieces making the foregoing cutting operations unnecessary.

The handlebar end portions 18,20 are adjusted from an existing position to another position by loosening the clamping means which holds the coupler members (44,46; 144,146; or 244,246) fixed with respect to each other, adjusting the end handlebar portions 18,20 to the desired position and tightening the clamping means. While the clamping or retaining means shown in the Figures consists of a nut and bolt, that means may take other forms such as a spring-loaded pushbutton clamp release, spring-loaded toggle and cam release or any other clamping or retaining device allowing the coupler members to be unlocked so that one may be rotated with respect to the other and then locked together again.

When a rider wishes to change handlebar position, he releases the clamping or retaining means thereby disconnects or unlocking the coupler members, e.g., 44,46 (or 144,146; 244,246), rotates grip 34 to the position desired and connects or locks said coupler members against rotation by tightening the clamping or retaining means. The embodiment of a clamping or retaining means shown in FIG. 3 comprises a simple bolt or screw and nut arrangement. Nut or knob 52 is rotated loosening bolt 50 thereby unlocking the coupler members so they may be mutually rotated. Counter rotation of knob 52 locks the coupler members together to prevent undesired rotation. If desired, a blocking or stop means may be added to the clamping means shown in FIG. 3 to insure that the clamp will not be inadvertently loosened as by shocks transmitted from a rough bicycle path surface. Two embodiments of stop means that may be used with the clamping or retaining means shown in FIG. 3 are depicted in FIGS. 7 and 8. In FIG. 7, the stop comprises a blocking member 456 inside nut 452 which is urged by a coil spring 460 into one of a plurality of sockets 454, radially disposed about bolt 50, in coupler member 444. Blocking member 456 when seated in a socket prevents the rotation of knob 452. Retraction of blocking member 456 into knob 452 by pressing or lifting lever 466 on knob 452 must precede rotation of the knob. In FIG. 8, a different embodiment of stop means is shown. Stop 584 comprises a resilient lever the free end 582 of which normally engages one of a plurality of notches 580 cut into the periphery of knob 552. Handlebar adjustment with a coupler having this embodiment of stop means requires that free end 582 be pressed before and during the rotation of knob 52. Other embodiments of stop means can be devised by those skilled in the art either with the retaining means embodiment shown in FIG. 3 or with other retaining means. Even with a stop means present, adjustment of a pair of handlebars from one position to another can be accomplished in less than one minute without hand tools and, if desired, may be accomplished by an experienced rider without his dismounting from or even stopping the bicycle. To achieve this advantage, I prefer to mount each coupler so that the knobs or other clamping means release elements and stop activating elements are easily accessible to the bicycle rider.

An additional advantage of the use of the couplers is in collapsing the handlebars for compact storage or shipment of the bicycle. The couplers (40,42; 140,142; or 240,242) permit the handlebars to be rotated and clamped in positions relatively close to the frame of the bicycle thereby narrowing the space occupied by the bicycle without disassembly of handlebars 14 from steering column 12.

A further advantage of the present invention is that adjustment of the handlebar gripping portions 30,32 does not alter the direction of operation of the hand brake levers 36.

The invention has been described in detail with particular emphasis on the preferred embodiments. It should be understood that variations and modifications within the spirit and scope of the invention may occur to those skilled in the art to which the invention pertains.

I claim:

1. A handlebar comprising:
   a central handlebar portion having opposite attachment ends;
   an end portion associated with each of the attachment ends of said central handlebar portion, each end portion having an attachment end and a free end;
   first coupler members attached to the opposite attachment ends of the central handlebar portion, each of said first coupler members having locking means for cooperating with the locking means of another coupler member;
   a second coupler member for cooperating with each of the first coupler members, said second coupler member being attached to the attachment ends of the respective end handlebar portions, each of said second coupler members having locking means for cooperating with the locking means of the cooperating first coupler members;
   connecting means interconnecting said first and second coupler members for relative rotation between a plurality of predetermined positions;
   retaining means operatively associated with said connecting means, said retaining means being movable between a retaining condition for selectively retaining the locking means of said first and second coupler members in a locking condition to fix the handlebar portions in selected positions, and a releasing condition for freeing the locking means to unlock said coupler members to free the handlebar portions for movement to different portions, said retaining means including:
   knob means attached to said connecting means for actuating said retaining means, and
   blocking means operatively connected to said knob means and movable between a blocking position for blocking said coupler members against relative movement from a locked condition, and an unblocking position for enabling relative movement of said coupler members.

2. The invention according to claim 2 wherein the respective locking means of each of said first coupler members comprise teeth, and the respective locking means of said second coupler members comprise teeth engageable with the locking means of the cooperating first coupler member, the teeth of the respective pairs of cooperating locking means being in a blocking relationship when said retaining means are retaining the respective first and second locking means in a locking condition.

3. The invention according to claim 2 wherein the teeth of the respective coupler members comprise radially extending teeth.

4. The invention according to claim 2 wherein said connecting means each comprise:
   bolt means passing through each of said cooperating first and second coupler members; and
   nut means for rotating said bolt means to selectively draw together and separate the locking means of said cooperating first and second coupler members.

5. The invention according to claim 1 wherein the respective handlebar portions are tubular, and the respective coupler members are mechanically attached to the respective handlebar portions.

6. A device for releasably attaching an end handlebar portion, said end handlebar portion having an attachment end and a gripping end, to a central handlebar portion, said central handlebar portion having a connection to a steering post and an attachment end displaced from said steering post, and for selectably locking the handlebar portions together in a preselected position, said device comprising:
   a first coupler member, including first attaching means for attaching said first coupler member to the attachment end of the central handlebar portion, and first locking means for cooperating with locking means on another coupler member;

a second coupler member, including second attaching means for attaching said second coupler member to the attachment end of the end handlebar portion, and second locking means for cooperating with the locking means on the first coupler member to releasably lock said handlebars in the preselected position;

connecting means interconnecting said first and second coupler members for relative rotation between a plurality of predetermined positions;

retaining means operatively associated with said connecting means, said retaining means being movable between a retaining condition for selectively retaining the locking means of said first and second coupler members in a locking condition to fix the handlebar portions in selected positions, and a releasing condition for freeing the locking means to unlock said coupler members to free the handlebar portions for movement to different positions, said retaining means including:

knob means attached to said connecting means for actuating said retaining means, and blocking means operatively connected to said knob means and movable between a blocking position for blocking said coupler members against relative movement from a locked condition, and an unblocking position for enabling relative movement of said coupler members.

7. The device defined in claim 6 wherein said first and second attaching means each include pin means for preventing rotation of said first coupler member about said central handlebar portion and said second coupler member about said end handlebar portion, respectively.

8. The device defined in claim 6 or 7 wherein said first attaching means includes first and second coupler sections having opposing surfaces configured to engage the periphery of the attachment end of said central handlebar portion and tightening means for drawing said coupler sections together to clamp said first coupler member on said central handlebar portion; and wherein said second attaching means includes third and fourth coupler sections having opposing surfaces configured to engage the periphery of the attachment end of said end handlebar portion and tightening means for drawing said coupler sections together to clamp said first coupler member on said end handlebar portion.

9. The device defined in claim 7 or 1 wherein said end handlebar and central handlebar portions have tubular cross sections and said first and second attaching means comprise attachment portions having cross sections for sliding engagement within said tubular cross sections.

10. The device defined in claim 6 or 1 wherein said first coupler member is formed as an integral part of said central handlebar portion and said second coupler member is formed as an integral part of said end handlebar portion.

11. The device defined in claim 6 wherein said first locking means and said second locking means comprise mutually engageable teeth, said teeth being in a blocking relationship when said retaining means are retaining said locking means in the locking condition.

12. The device defined in claim 11 wherein said mutually engageable teeth comprise equally spaced radial teeth.

13. The device defined in claim 6 wherein said connecting means comprises:

bolt means passing through said first and second coupler members; and nut means engaging said bolt means at the end opposite its head.

14. The device defined in claim 6 wherein said first and second coupler members are formed of thermoplastic material.

15. In a bicycle having a front wheel and a steering post extending in generally upward and downward directions when the bicycle is in an upright position, a handlebar attached to the steering post, the handlebar having junctures at positions displaced from and on opposite sides of the steering post to divide the handlebar into an attached handlebar portion extending in opposite directions from the steering post and gripping handlebar portions spaced from the sterring post, the gripping portions being bent to extend generally parallel to the wheel and downward, a pair of coupling assemblies each comprising cooperating pairs of releasable coupler members attached to the handlebars at the respective junctures and configured to selectively lock each gripping handlebar portion against rotation relative to the adjacent attached handlebar portion when the respective cooperating pairs of members are retained together and to unlock each gripping handlebar portion for rotation relative to the adjacent attached handlebar portion in a plane transverse to the wheel when the respective cooperating pairs of members are released, connecting means interconnecting the respective pairs of coupler members, and retaining means for selectively retaining and releasing the locking configurations of the respective pairs of coupler members, each of said retaining means being operatively associated with one of said connecting means and being movable between a retaining condition for selectively retaining the respective pair of coupler members in a locked condition and a releasing condition for unlocking the pair of coupler members, each of said retaining means including knob means attached to said connecting means for actuating said retaining means and blocking means connected to said knob means for movement between a blocking position for blocking the pair of coupler members against movement from a locked condition and an unblocking condition for enabling relative movement of the pair of coupler members; the gripping handlebar portions being adjustable, when the respective cooperating pairs of members are unlocked, to and lockable in, a racing position wherein the gripping portions are at elevations below the place of attachment of the attached handlebar portion to the steering post and a touring position wherein the gripping portions are at elevations at least as high as the place of attachment of the attached handlebar portion to the steering post.

16. The invention according to claims 6, 15 or 1 wherein said blocking means is movable in a linear path.

* * * * *